(12) United States Patent
Taxon

(10) Patent No.: US 6,895,943 B1
(45) Date of Patent: May 24, 2005

(54) FUEL VENT ASSEMBLY WITH FLOATLESS ROLLOVER PROTECTION

(75) Inventor: Morse N Taxon, Oak Park, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 11 days.

(21) Appl. No.: 10/706,158

(22) Filed: Nov. 12, 2003

(51) Int. Cl.$^7$ .............................................. F02M 33/02
(52) U.S. Cl. ........................ 123/516; 123/518; 123/519
(58) Field of Search ................................ 123/516, 518, 123/519, 520; 137/197

(56) References Cited

U.S. PATENT DOCUMENTS

| | | | |
|---|---|---|---|
| 2,467,217 A | * | 1/1949 | Mikeska ..................... 137/197 |
| 4,966,299 A | | 10/1990 | Teets et al. |
| 5,413,137 A | * | 5/1995 | Gimby ........................ 137/200 |
| 6,432,169 B1 | * | 8/2002 | Kluwe et al. .................. 95/52 |
| 6,591,857 B2 | | 7/2003 | Engle et al. |
| 6,634,341 B2 | | 10/2003 | Crary et al. |
| 2002/0160245 A1 | * | 10/2002 | Genc ........................... 429/26 |

* cited by examiner

Primary Examiner—Thomas Moulis
(74) Attorney, Agent, or Firm—Ralph E. Smith

(57) ABSTRACT

A valve for use between a vehicle fuel tank vent and a vapor recovery canister in a vehicle fuel tank containing liquid fuel, such a valve comprises: a housing having a fuel tank side and a vapor recovery canister side; and a vapor permeable membrane fixed to the housing to block the passage of liquid fuel.

15 Claims, 2 Drawing Sheets

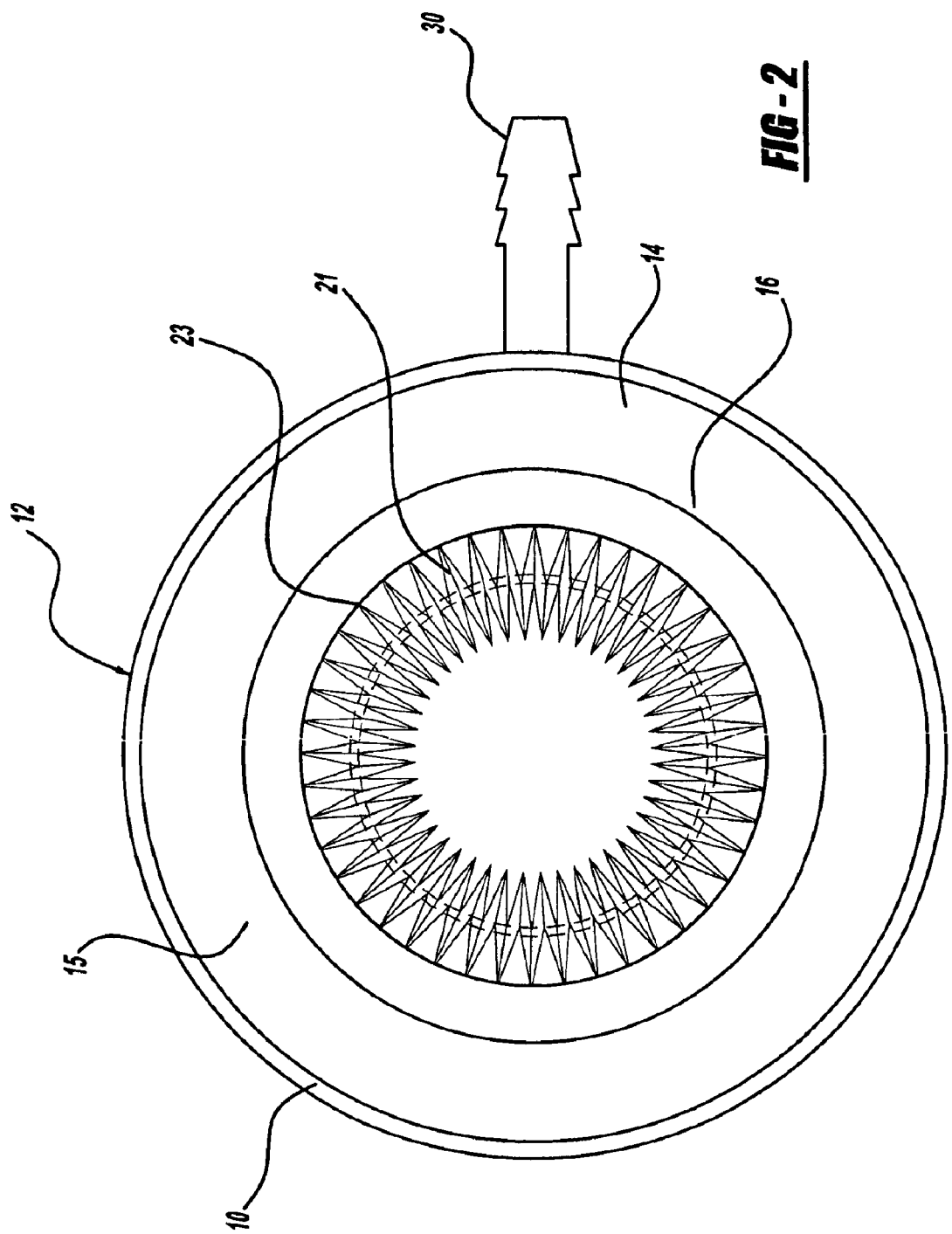

FUEL VENT ASSEMBLY WITH FLOATLESS ROLLOVER PROTECTION

FIELD OF THE INVENTION

The present invention relates to an improved fuel tank vent assembly. More specifically, the present invention is directed to a vehicle fuel tank vent assembly that has no moving parts and provides a durable, inexpensive, vent that will not permit liquid fuel to leak out of the tank in the case of a vehicle rollover.

BACKGROUND OF THE INVENTION

When a vehicle's fuel tank is filled with liquid fuel at the gas station by means of the typical fuel pump nozzle, fuel vapor above the liquid fuel in the interior of the fuel tank is displaced as the fuel level increases. Obviously, this vapor must be vented for the tank to be filled. Because it is undesirably to vent fuel vapor directly into the atmosphere, modern vehicles all employ a vapor recovery system that in its most simplistic form consists of a vent hole in the tank connected via a tube to a vapor recovery canister.

As early vapor recovery systems came into use, it was discovered that a valve of some kind had to be incorporated between the vent hole and the vapor recovery system. Such a valve is necessary because vapor recovery canisters are inundated by liquid fuel that splashes out of a full fuel tank, and, more significantly, liquid fuel would drain out of the fuel tank creating a significant fire hazard in the case of a vehicle rollover.

A variety of fuel vent valves have been developed to address this problem. Such valves are described in U.S. Pat. Nos. 4,966,299; 6,591,857; and 6,634,341. These vent valves employ all manner of floats, springs, and combinations thereof that work to partially or completely close the fuel vent to prevent splashing fuel from entering the vapor recovery system and to completely seal the fuel vent in case of vehicle rollover.

A mechanical floats, springs, and combinations suffer from similar problems. They are mechanical devices involving moving parts, and they have a failure rate depending on assembly failure, material failure, temperature, humidity, wear, etc. of these parts.

SUMMARY OF THE INVENTION

One object of the present invention is a simplified fuel vent that has minimal moving parts.

Another object of the present invention is a fuel vent that is resistant to failure and inexpensive to manufacture.

These and other objects of the invention are satisfied by a valve for use between a vehicle fuel tank vent and a vapor recovery canister, where such a valve comprises: a housing having a fuel tank side and a vapor recovery canister side; and a vapor permeable membrane fixed to the housing to block the passage of liquid fuel.

BRIEF DESCRIPTION OF THE DRAWINGS

FIG. 2 is a longitudinal cross section of the embodiment shown in FIG. 1, showing a bottom view of the pleated, conical, vapor permeable membrane.

DETAILED DESCRIPTION

Figure 1:
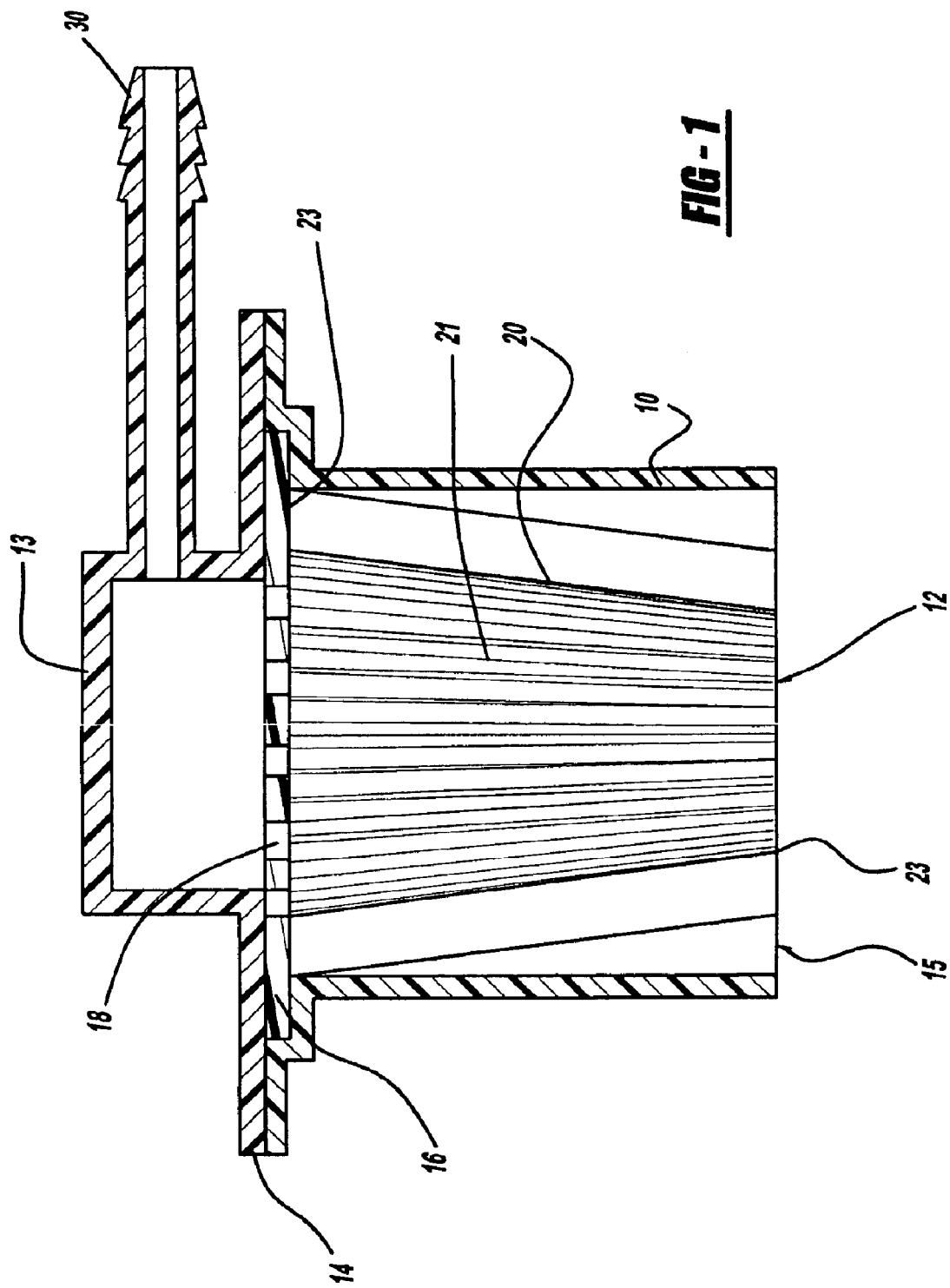
FIG. 1 is cutaway side view of a preferred embodiment illustrating a pleated, conical, vapor permeable membrane.

A valve according to the invention for use between a vehicle fuel tank vent and a vapor recovery canister in a vehicle fuel tank containing liquid fuel represents a major improvement over the prior art because it has no moving parts.

In its most basic form, a valve according to the present invention comprises a housing formed using the minimum number of injection molded, blow molded, cast, etc. components that are then snapped, bonded, or welded together. A vapor permeable membrane that allows passage of air and fuel vapor, but uses the surface tension of the fluid to prevent its passage is fixed in the housing to block the passage of liquid fuel. The pore size of such material is preferably 0.2 to 5.0 microns; more preferably 0.45 to 0.80 microns; and most preferably 0.45 to 0.80 microns. Preferably, the housing is configured to permit mounting of the vapor permeable membrane so th at the membrane is protected from fuel splashing.

The preferred vapor permeable membrane is an acrylic copolymer on a woven or non-woven polyamide (nylon) support. Such material is available from the Pall Corporation and is sold as Versapor® membrane material. Vapor permeable materials such as polytetraflouroethane on woven or non-woven nylon (Gore-Tex®) are also adaptable for use in the present invention.

In order to increase the surface area of the vapor membrane, it is preferred that the membrane be pleated. Without wishing to be bound by theory, it is the inventor's belief that the most efficient shape for the membrane is a pleated cone suspended in the housing with the narrowest portion of the cone facing toward the fuel tank. Such a configuration has a number of advantages. Pleating increases membrane surface area. The cone shape is easy to insert in the housing simplifying assembly. And the natural compression of the vapor at the upper part of the cone farthest from the fuel tank helps the vapor rapidly diffuse through the membrane.

A number of alternative embodiments are possible depending on the membrane type, size, positioning, etc.; fuel type; average ambient temperature; etc. Such embodiment may employ for example, a cylindrical and pleated membrane, a double layer membrane of material having the same pore size, or a double layer of membrane material having different pore sizes.

Turning to the Figures where like numbers refer to like parts. FIGS. 1 and 2 illustrate a preferred embodiment of a valve according to the present invention having a housing 10 roughly in the shape of a cylinder. The housing 10 has a fuel tank side 12 and vapor recovery side 13. A flange 14 surrounds the upper perimeter of the housing and supports the vent when it is inserted into a vent hole in a fuel tank. The flange may be secured to the fuel tank using welding (such as ultrasonic welding), bonding (using adhesive), or appropriate fasteners (screws, bolts, rivet, brads, etc.). Fixed in the housing 10 is a conically shaped pleated membrane 20. The membrane 20 is fixed at the recovery side 13 via an upper support 16 having vapor air passages 18. (Alternatively, the upper support 16 could consist of a ring of material.)

At the fuel tank side 12, the narrower portion of the conically shaped pleated membrane may narrow to a point, or be sealed at the edge 23 using a circular plate of appropriate material. Fuel vapor enters the space 15 between the housing 10 and the membrane 20. This arrangement suspends the membrane 20 inside the housing 10 presenting the maximum area of the membrane sides 21 for diffusion of fuel vapor while preventing sloshing or splashing liquid fuel from impacting the membrane sides 21. A port 30 at the recovery side 13 connects the vent to the vapor recovery canister (not shown).

While there are no evaporative emission regulations for diesel fuel, vapor recovery canisters are not used in diesel vehicles. But there is still a need a need in such vehicles to vent vapors during refueling events, during hot soak conditions when vapor is formed, and to prevent fuel leakage during rollover incidents. For these reasons, valves according to the present invention are also useful in fuel systems for diesel vehicles.

Rollover valves, of course, also allow air into the tank to compensate for the volume of fuel used by the engine. In a diesel system lacking the vapor recovery canister, the valve is exposed directly to the air. In order to prevent dirt from being ingested into the ball, float, etc. mechanism of a standard rollover valve and then into the tank, many diesel vehicles additionally include a filter on their exterior surface to remove particles from this reverse flow air. Since the fine pore sizes of the vapor permeable membrane of the present invention effectively filter air entering the tank as well as allowing the escape of vapor, the additional cost and complication of a second filter is eliminated in diesel applications.

It is to be understood that although the invention has been described with particular reference to specific embodiments, the forms of the invention shown and described are to be taken as a non-limiting embodiment and various changes and modifications, such as the development of new and better vapor permeable materials, may be made to the invention without departing from its spirit and scope as described in the claims.

What is claimed is:

1. A valve for use between a vehicle fuel tank vent and a vapor recovery canister in a vehicle fuel tank containing liquid fuel, said valve comprising:
   a housing having a fuel tank side and a vapor recovery canister side; and
   a pleated, vapor permeable membrane fixed to said vapor recovery canister side to block passage of liquid fuel.

2. A valve for use between a vehicle fuel tank vent and a vapor recovery canister in a vehicle fuel tank containing liquid fuel, said valve comprising:
   a housing having a fuel tank side and a vapor recovery canister side; and
   a cone shaped, vapor permeable membrane fixed to said vapor recovery canister side to block passage of liquid fuel.

3. A valve for use between a vehicle fuel tank vent and a vapor recovery canister in a vehicle fuel tank containing liquid fuel, said valve comprising:
   a housing having a fuel tank side and a vapor recovery canister side; and
   a cylindrical, vapor permeable membrane fixed to said vapor recovery canister side to block passage of liquid fuel.

4. The valve of claim 2, where said cone shaped vapor permeable membrane has a narrow portion and a wide portion.

5. The valve of claim 4, where said cone shaped vapor permeable membrane is positioned inside said housing with said narrow portion oriented toward said fuel tank side.

6. The valve of claim 1, where said vapor permeable membrane is cone shaped.

7. The valve of claim 3, where said vapor permeable membrane is pleated.

8. The valve of claim 1, where said vapor permeable membrane is a double layer material.

9. The valve of claim 1, where said vapor permeable membrane is an acrylic copolymer material on a polyamide support.

10. The valve of claim 1, where said vapor permeable membrane has pore sizes of 0.2 to 5.0 microns.

11. The valve of claim 1, where said vapor permeable membrane has pore sizes of 0.45 to 0.80 microns.

12. The valve of claim 2 wherein said vapor permeable membrane is a double layer material.

13. The valve of claim 3 wherein said vapor permeable membrane is a double layer material.

14. The valve of claim 2 wherein said vapor permeable membrane is an acrylic copolymer material on a polyamide support.

15. The valve of claim 3 wherein said vapor permeable membrane is an acrylic copolymer material on a polyamide support.

* * * * *